United States Patent [19]

Palmer et al.

[11] 4,371,345

[45] Feb. 1, 1983

[54] MULTI-DIMENSIONAL DISPLAY EQUIPMENT

[75] Inventors: John H. W. Palmer, Henleaze; Alexander J. R. MacDonald, Clifton, both of England

[73] Assignee: National Research Development Corporation, London, England

[21] Appl. No.: 198,008

[22] PCT Filed: Feb. 19, 1979

[86] PCT No.: PCT/GB79/00033

§ 371 Date: Oct. 17, 1980

§ 102(e) Date: Oct. 17, 1980

[87] PCT Pub. No.: WO80/01728

PCT Pub. Date: Aug. 21, 1980

[51] Int. Cl.³ ............... G09B 23/30; G09B 25/00
[52] U.S. Cl. .................................. 434/368; 434/269
[58] Field of Search ............ 434/72, 76, 88, 269, 434/368, 152; 40/587, 367

[56] References Cited

U.S. PATENT DOCUMENTS

| 218,893 | 8/1879 | McIlvenna | 434/88 X |
|---|---|---|---|
| 1,720,736 | 7/1929 | Kuipers | 40/587 |
| 1,838,887 | 12/1931 | Turner | 40/587 |
| 2,196,618 | 4/1940 | Watson | |
| 2,610,413 | 9/1952 | Dasey | 434/72 X |
| 2,915,832 | 12/1959 | Phillips | 434/72 |
| 3,276,146 | 10/1966 | Epstein | |
| 3,822,938 | 7/1974 | Hirsch | 40/367 X |

FOREIGN PATENT DOCUMENTS

| 847082 | 8/1952 | Fed. Rep. of Germany . | |
|---|---|---|---|
| 1232377 | 1/1967 | Fed. Rep. of Germany | 434/72 |
| 2389189 | 11/1978 | France . | |
| 344685 | 3/1931 | United Kingdom | 434/88 |
| 633712 | 12/1949 | United Kingdom . | |
| 634316 | 3/1950 | United Kingdom . | |

Primary Examiner—Harland S. Skogquist
Attorney, Agent, or Firm—Cushman, Darby & Cushman

[57] ABSTRACT

Display equipment gives a representation of a three-dimensional body. A series of spaced apart panels (28) are mounted to a support structure (30). Each panel (28) carries representations (40) of parts of the three-dimensional body which occur in the plane occupied by the panel. The panels are transparent or open to allow the representations carried by the different panels to be simultaneously viewed by light passing through the panels, thereby giving the effect of seeing the three-dimensional body. The equipment can be used to give a three-dimension view of the interior structure of human or animal bodies by providing cross-sectional representations of the body on the panels.

23 Claims, 15 Drawing Figures

MULTI-DIMENSIONAL DISPLAY EQUIPMENT

TECHNICAL FIELD

This invention relates to display devices, especially for educational or instructional use, and has as an object to present a multi-dimensional display built up from two- or three-dimensional pictorial elements.

BACKGROUND

It is particularly useful to be able to display in three dimensions the interior structure of human, animal and other organisms. Practically all of the data available on such organisms has at some time been collected from cross-sections through the organism. From such sections, over the years, data has been collected and stored as pictures in books, on photographic slides and the like. It is an object of this aspect of the invention to display this information in a multi-dimensional pictorial form. It is known (U.K. Specifications No. 633712 and 634316) to provide a set of parallel transparent panels mounted to a support frame to represent different heights above the ground, for the purpose of plotting the movements of aircraft. However, the pictorial representation is continually changing and does not represent a three-dimensional structure.

SUMMARY OF THE INVENTION

In one aspect, the present invention provides multi-dimensional display equipment, comprising a plurality of transparent panels bearing representations of cross-sections of a three-dimensional body, or upon which such representations may be applied, and a support structure adapted to carry the panels in spaced relationship so that the sections represented on the panels may be located in their correct relative order, the support structure being adapted to allow the sectional representations to be viewed in situ from different positions externally of the structure, by means of light transmitted through the transparent panels.

The panels may be mutually spaced apart so as to represent separate cross-sections of the body. However, some at least of the panels may be spaced so that they contact or intersect each other, thereby representing converging or intersecting sections through the body. The panels are preferably planar, but they may be provided with a moulded or textured surface if desired.

The equipment preferably includes means for determining co-ordinates of a point on a said panel both in terms of its position in relation to the panel and also in terms of its position on an axis intersecting the planes of the panels. The co-ordinate determining means preferably includes a scale on the support structure along a said axis (herein called the z-axis) intersecting the planes of the panels and arranged so as to show the location of the panels on that axis. The co-ordinate determining means may also include two further scales on the support structure extending along axes (herein called the x- and y-axes respectively), parallel to the planes of the panels, by means of which the co-ordinates of a said point in relation to its respective panel may be determined. Thus the position of a point on any panel can be identified by its location in the plane of the panel on the x, y-axes and the location of the panel itself on the z-axis. The z-axis scale may be provided on one or more of a number of posts of the support structure to which posts the panels are mounted. The x- and y-scales may alternatively be provided on the panels themselves, for example in the form of a grid of intersecting lines. Preferably the x- and y-scales are provided, suitably in the form of a grid of intersecting lines, on separate transparent sheets which can be laid on the panels.

The support structure may take the form of a container, having means therein for supporting the panels, and transparent or open-sided walls through which the panels may be viewed. The spatial arrangement of the panels need not be such as to give the sections their original relative spacing, but they may be arranged to give a more expanded or condensed spatial relationship. Alternatively, the support structure may include a number of posts to which the panels are connected. The panels are preferably mounted to the support structure so that they can be individually inserted or removed in any desired order. The panels may be held in individual sub-frames which are mounted to the support structure. Alternatively the panels may be each held by a number of separate sub-frame elements which are mounted to respective parts of the support structure. The sub-frames or sub-frame components are preferably of resilient material so as to apply a degree of tension in the panel, particularly where the panel is made of flexible material. The mounting of the panels to the support structure preferably allows the spacing of the panels to be adjusted. For example, the panels may be attached to support posts by clips which can be positioned as desired on the support posts. The support posts may have recesses at intervals to locate panel mounting means at alternative positions. The panels may be mounted to support posts by attachment to sliders carried by the posts. The support posts may be jointed or telescopic or resiliently deflectable if desired so as to vary their length or position. This may be useful for altering the scale of the z-axis, or for studying the effect of altering spatial relationships, for example in studying the shear strain in crystals under stress. Similarly the panels may be elastically extendable to vary the x, y-axes.

The panels are of thin transparent material which should be dimensionally stable, particularly against stretching, creep, tearing, and adverse effects of light, heat and moisture. (In some cases stretchability may be required, as noted above, but the panels should then be elastic so as to return to the original dimensions in the relaxed state.) Glass may be used, particularly for very accurate work, but polymeric film material is generally preferred for its lower cost and greater resistance to damage. Suitable polymers are cellulose acetate, cellulose xanthate, polyester, polycarbonate and acrylic polymers. Cellulose xanthate or polyester are generally preferred for their low cost. The panels may be photographic films or plates. X-ray films or plates may be used by bleaching opaque areas and then varnishing these and any other translucent areas to render them transparent. The panels should preferably be capable of accepting ink, and allowing subsequent erasure of ink therefrom. The panels may have raised regions produced by moulding the film material of the panels themselves or by adhering separate elements thereto. These raised regions may be provided, for example, for improving the rigidity of the panels or providing a means for locating a coordinate reference sheet (e.g. a grid sheet) or other element laid on the panel. A panel may have one or more holes therein, for example to allow insertion of elements intersecting the plane of the panel.

The panels may be separated from each other by spacers associated with the individual panels. In this way, the support structure carries a stack of the panels but does not determine the spacing between the panels. The spacers may take the form of separate elements which are adhered to the panels. This may serve to bond the panels together to form the stack. The adhesive may be peelable or removable so that the panels can be separated. Magnetic spacers could be used, thereby enabling the stack to be readily dismantled. The poles of the magnets may be arranged relative to the panels so that the panels are always stacked in the correct configuration. In an alternative method, the panels of film material may have moulded portions, e.g. channels or dimples, to provide integral spacers for the panels.

The apparatus may include means for illuminating the supported panels so that the panels can be externally viewed by means of the light from the illuminating means transmitted through the panels. A light source for this purpose may be provided in the base of the support structure. A separate light source may be provided which can be slid between adjacent panels in the support structure so as to illuminate only those panels located above the light source.

The equipment may further include a set of reference sheets, preferably in book form, bearing illustrations matching the representations on the panels, so that the panels may be individually removed from the support structure and placed alongside or over the matching illustration on a reference sheet. A reference grid may be provided for the reference sheets, either as a separate transparent grid sheet to be placed over the reference sheet, or directly printed on the reference sheet, whereby the co-ordinates of a particular feature of a section may be identified.

Another aspect of the invention comprises display equipment as described above except that the transparent panels do not carry cross-sectional representations. The panels may each bear a printed reference grid or other co-ordinate determining scales, or they may be entirely blank. The intention here would be for the user to apply the cross-sectional representations himself, for example by drawing or printing directly on the panels, or by superimposing thereon separately printed transparent sheets bearing the representations (it will be apparent that, if the panels carry a reference grid, this latter procedure would be equivalent to that described above in which the cross-sectional representations are provided on the panels and a reference grid on separate sheets).

A further aspect of the invention comprises display equipment as described above, except that a said panel, instead of comprising a transparent sheet, comprises a surround frame defining an interior space and adapted to support further elements within said space. For example, the frame may be provided with a grid of intersecting wires extending across said space; or the frame may be adapted for the attachment thereto of wires extending across said space. The surround frame may be provided with scales along its sides to define x, y axes for determining the co-ordinates of elements carried on the wires or the points of intersection of the wires.

The invention extends to support frames for receiving panels to form display equipment as described above. The invention further extends to panels for fitting to a support frame to form display equipment as described above.

BRIEF DESCRIPTION OF THE DRAWINGS

In order that the invention may be more clearly understood, various embodiments will now be described with reference to the accompanying drawings, wherein:

FIG. 3a is a horizontal sectional view through one of the corner posts of the embodiment shown in FIG. 3.

DESCRIPTION OF SPECIFIC EMBODIMENTS

Figure 1:
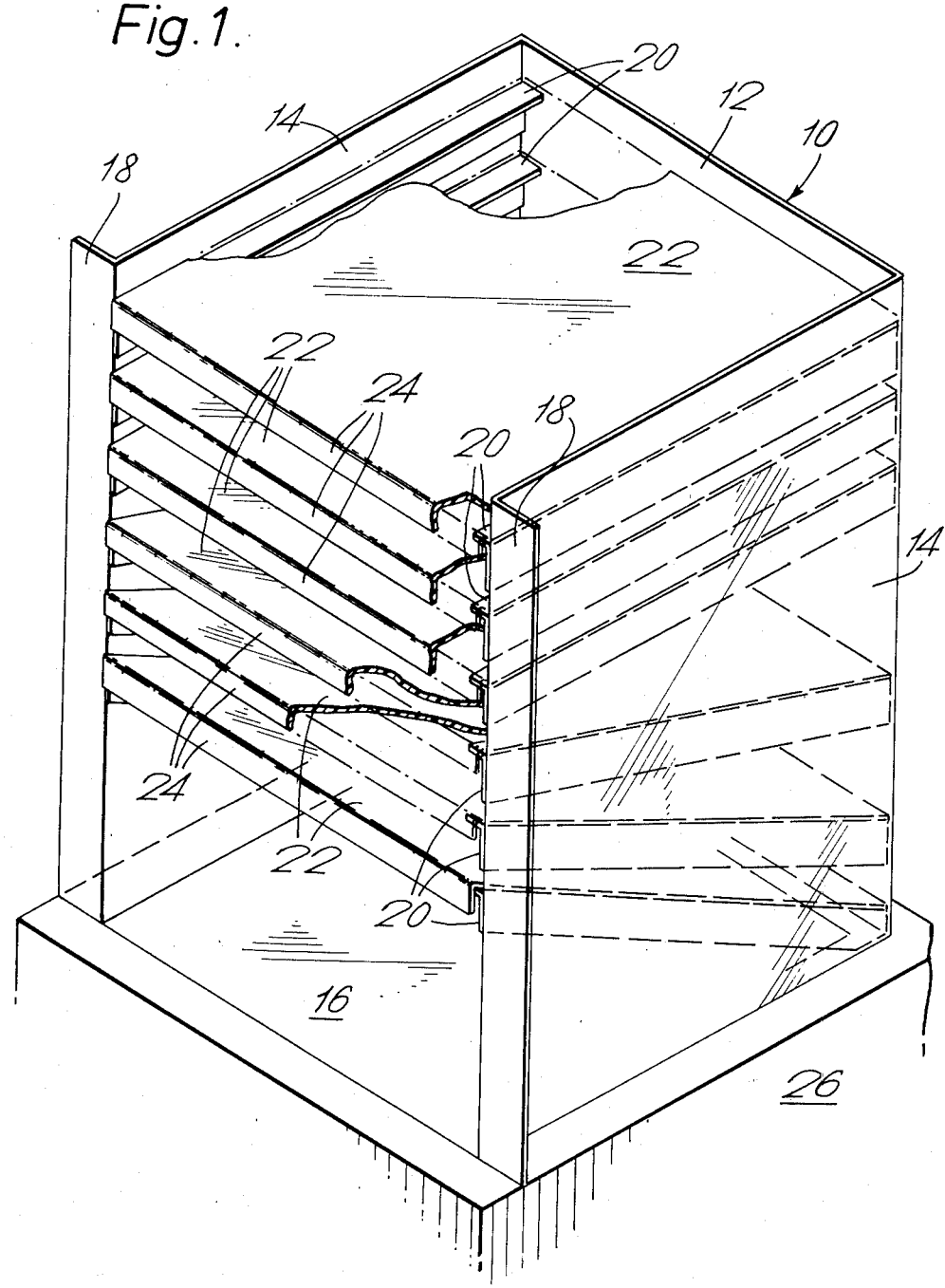
FIG. 1 shows a diagrammatic perspective view of a support container and panels therein.

Referring to the drawings; the apparatus of FIG. 1 comprises a box-like container 10 having a back wall 12, opposite side walls 14, and a bottom wall 16. The front edges of the side walls 14 are provided with outturned flanges 18 for the attachment thereto of a front panel when the apparatus is not in use. Angle members 20 are secured to the inside surfaces of the side walls 14 so as slidably to support panels 22. The panels 22 can be slid into position through the open front of the container, and depending flanges 24 may be provided on the front edges of the panels to facilitate their removal. The container is mounted on a light box 26. A suitable source of illumination, such as fluorescent lighting is provided in the light box to give uniform upward illumination. Except for the bottom wall 16, all of the walls of the container, and also the support members 20 and panels 22, are made of transparent material so that the light from the light box can be transmitted therethrough, and the pictorial information on the panels 22 can be viewed externally of the container. The bottom wall 16 is translucent to transmit glare-free uniform light from the light box. It will be seen from FIG. 1 that some of the panels are supported in horizontal spaced apart relationship, whereas others of the panels are supported in an inclined attitude. This relative positioning of the panels is entirely optional, and will depend upon the desired spacing of the sectional representations carried by the panels.

Figure 2:
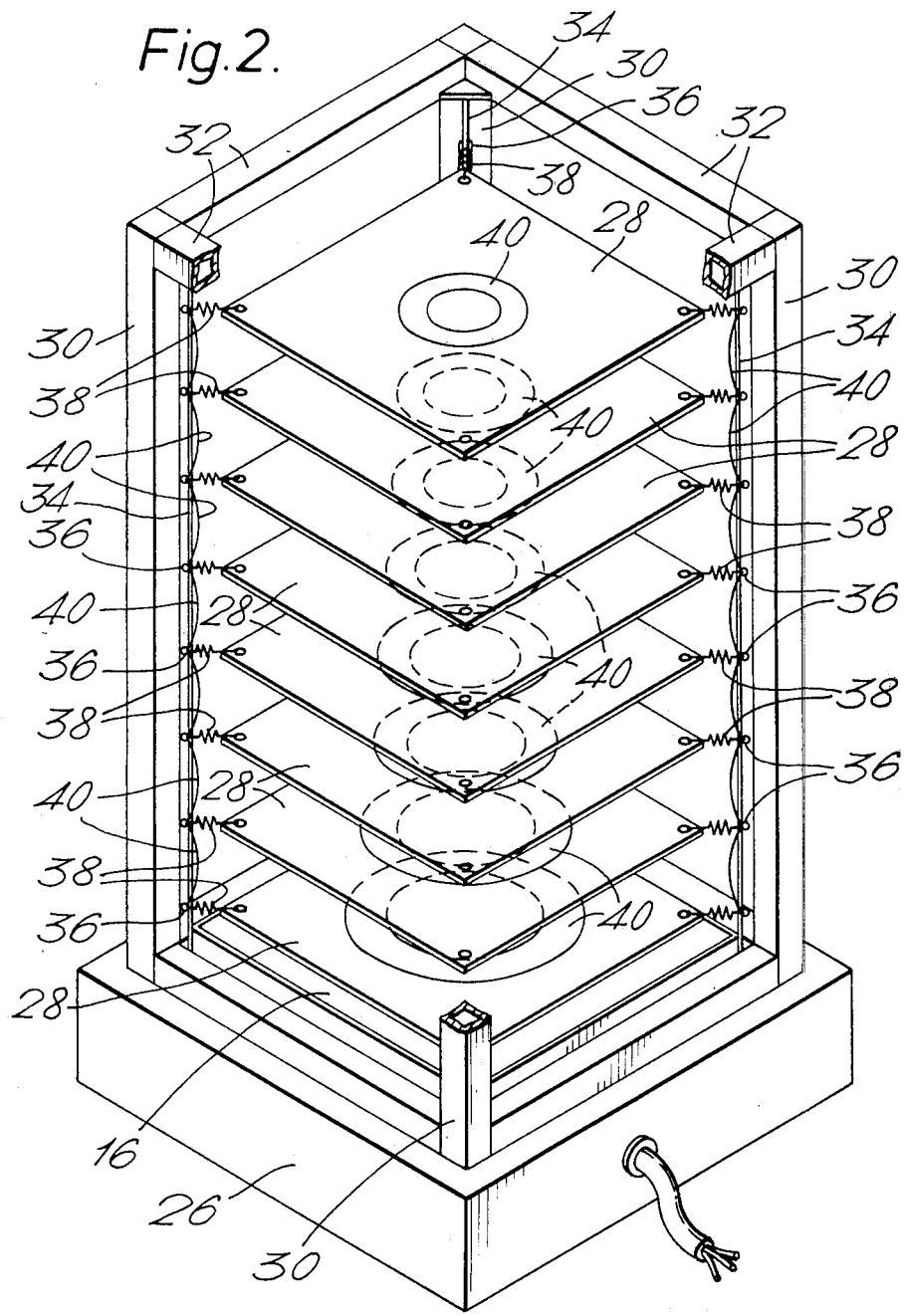
FIG. 2 shows a diagrammatic perspective view of a second embodiment of support container and panels.

FIG. 2 shows an alternative form of apparatus, including a light box 26 as in FIG. 1, but in this case transparent panels 28 are carried between the four corner posts 30 of a supporting container in the form of a framework which is open at the sides and the top. The corner posts are joined at the top by horizontal members 32. Alongside each corner post is a vertical rod 34 carrying sliders 36 to which the corners of the panels 28 are attached through tension spring connectors 38. The vertical spacing of the panels is controlled by spacer members 40 acting between adjacent sliders 36. These spacer members can be detached if desired.

Scales may be provided along the horizontal and vertical members of the framework to provide co-ordinate references. The scales on the vertical members will represent the z-axis, while those on the horizontal members in the two directions at right-angles to each other will represent the x and y axes. A cursor may be provided for the horizontal scales so that the x and y co-ordinates of a point on a panel can be read on the scales on the framework. The z co-ordinate for a panel can generally be read by noting the position of the attachment points for the panel on the vertical posts. Alternatively, calipers or dividers could be used to measure the position of a point relative to the x, y scales and the height of a panel on the vertical posts.

Figure 3:
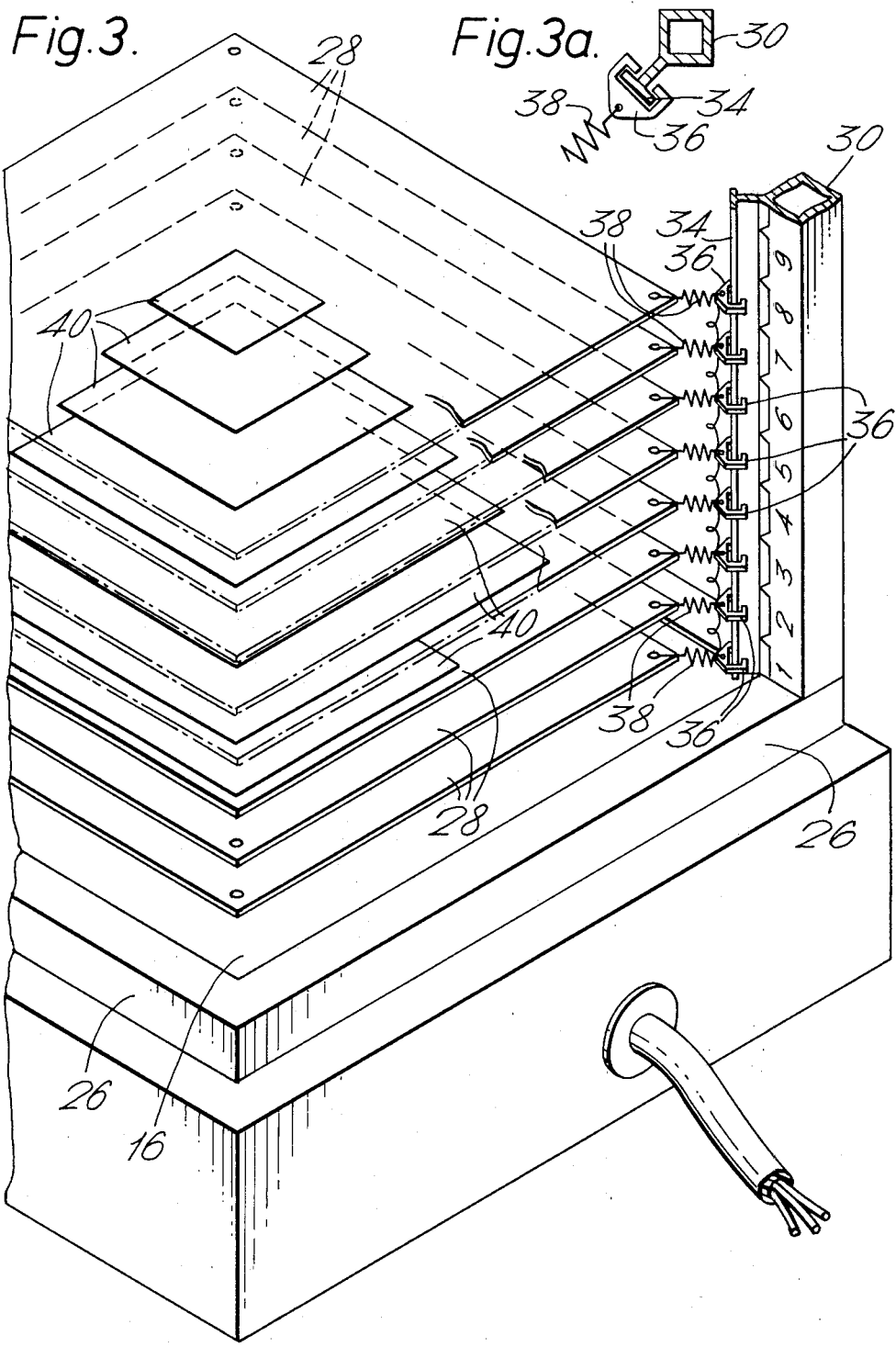
FIG. 3 shows diagrammatically some further details of a modified method of mounting of the panels in the embodiment of FIG. 2.

FIG. 3 shows in more detail part of a construction somewhat similar to that of FIG. 2. Instead of separate corner posts 30 and rods 34, the two components could be formed as a single extrusion, as shown in FIG. 3, the rod taking the form of a T-section extension on a rectangular section corner post. This is shown in more detail in FIG. 3a. Also, FIG. 3 shows how the corner posts can be marked with vertical graduations, providing a reference for accurately setting the positions of the sliders.

FIGS. 2 and 3 also give diagrammatic representations of indicia 40 applied to the panels. In FIG. 2 they are shown as series of circles of different diameters, whereas in FIG. 3 they are shown as rectangles of different diameters. The precise shapes of these indicia is optional, depending upon the three-dimensional body to be represented. In FIG. 2 a tubular body of circular cross-section is being represented, whereas in FIG. 3 an octahedral body is being represented. FIG. 2 also shows how the light from the light box 26 is directed upwardly, preferably through a transparent diffuser plate 16, so that the indicia carried by the panels 28 can all be viewed externally of the apparatus by the glare-free light transmitted through the series of panels. A similar diffuser plate 16 is provided at the top of the light box in FIG. 3.

Figure 4:
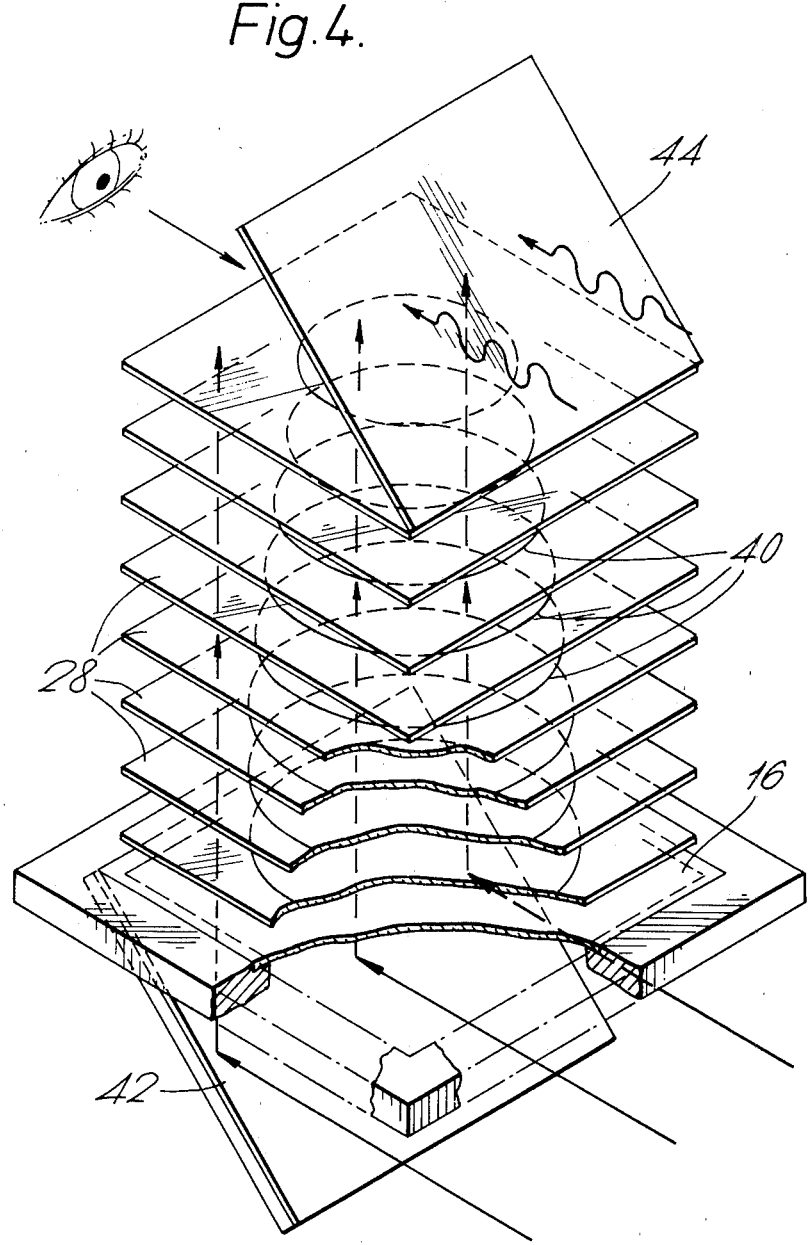
FIG. 4 shows a diagrammatic view of the method of viewing the panels when an integral light source is not available.

FIG. 4 shows how an external light source, such as daylight, can be used to view the indicia on the panels. The external light, as indicated by the arrows, is reflected by a mirror 42 which takes the place of the light box at the base of the support structure so that the reflected light passes directly upwardly through the series of panels 28. An opaque panel 44 is preferably provided at the other end to mask the external light source from the eyes of the viewer, so that the light passing through the panels is seen more clearly. The translucent diffuser plate 16 is preferably provided at the base of the support structure as in FIG. 3.

Figure 5A:
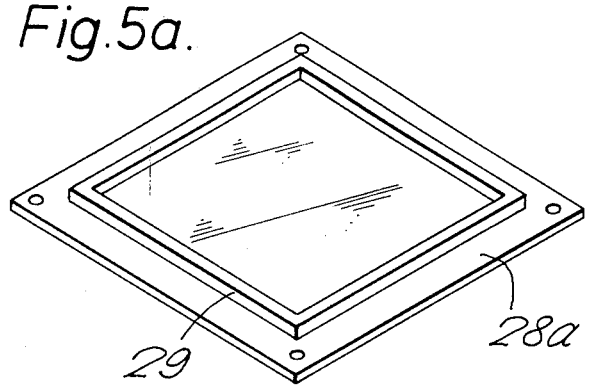
FIGS. 5a to 5c shows the construction of specially made panels.
Figure 5B:
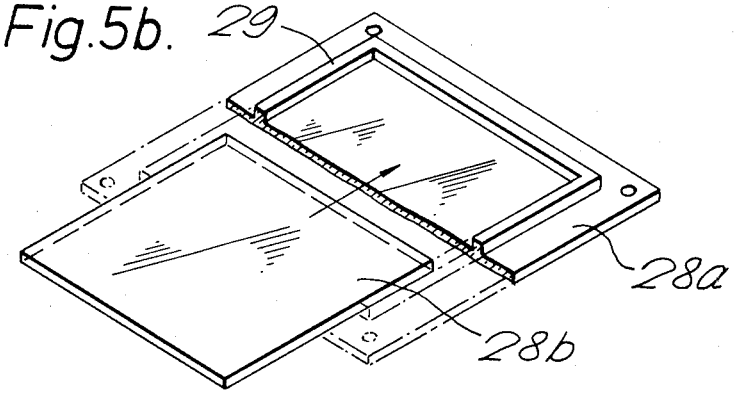
Figure 5C:
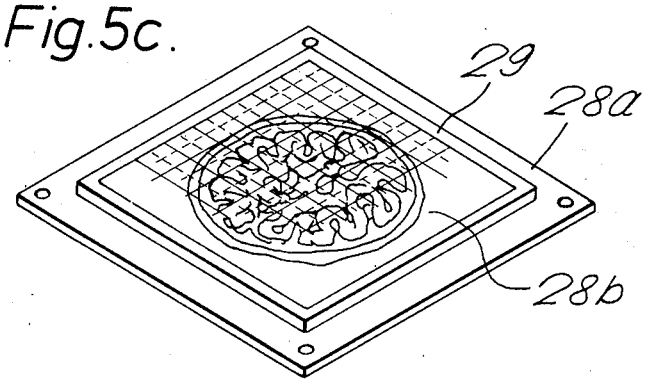

FIGS. 5a to 5c shows a specially made panel 28. As seen in FIG. 5a, a transparent rectangular panel 28a is provided, having a ridge 29 on its upper surface which defines an area in which can be inserted a transparent element 28b, as shown in FIG. 5b. The transparent area of the panel 28a may be free of indicia, or it may be marked with a sectional indicium or a reference grid therefor. The transparent element 28b likewise carries a reference grid or a sectional indicium. The finished composite as shown in FIG. 5c, may thus contain a sectional indicium and a superimposed reference grid.

Alternatively, the transparent plate 28a may be free of any markings within the central area, so that it can be used to carry any indicia such as sections or reference grids or both, as provided by one or more elements 28b laid thereon.

Figure 6:
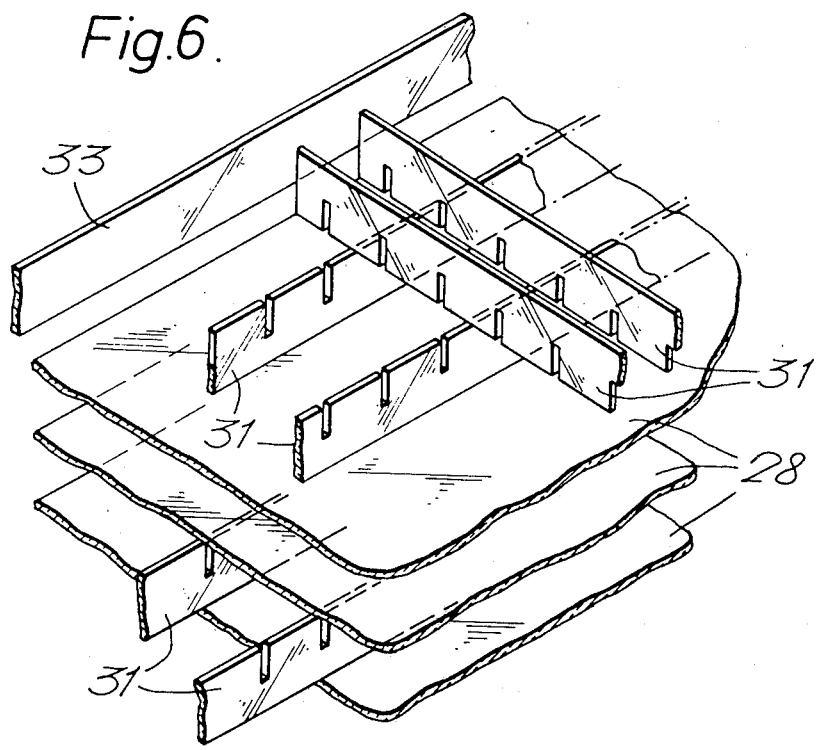
FIG. 6 shows diagrammatically an arrangement of intersecting panel elements.

As shown in FIG. 6, between the panels 28 can be located panel elements in the form of strips 31 which are slotted so as to interfit with each other. The grids of intersecting strips are located between adjacent panels 28 on the x, y axes, and carry indicia representing appropriate parts of sections taken through the body on these axes. The strips 31 are also transparent material, so that their indicia also can be viewed by the transmitted light. All the possible intersecting strips need not be fitted at any one time, merely those which are required to show the sections in the particular part of the body under examination at any given time. Thus, a small rectangular sectional element of the body can be examined. If desired, the strips 31 can be cemented to transparent surround strips 33 to form a firm self-supporting structure which can be placed between adjacent panels 28.

The above references to the "body" refer to any three-dimensional structure or arrangement which it is desired to study. It need not even be a solid body, but could for example represent an arrangement of elements in space. However, the preferred use for the invention is in showing anatomical sections, particularly through the human body.

Figure 7:
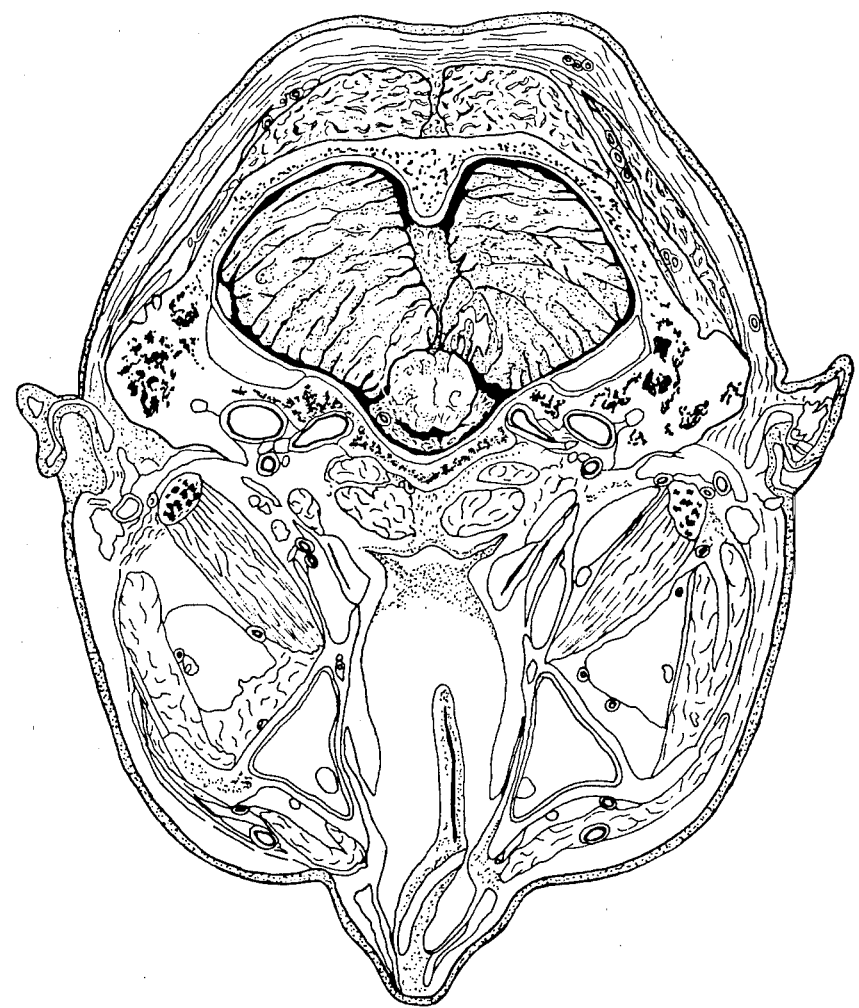
FIGS. 7 and 8 show two representations of sections which could be applied to adjacent panels.
Figure 8:

FIGS. 7 and 8 show two horizontal sections through a human head, FIG. 8 being a half section and FIG. 7 a full section, the two sections being taken at vertically spaced apart locations on the head. Indicia of this kind, preferably suitably coloured, could be applied to the plates, so that when the plates are arranged in the container in the correct sequence, and with a vertical spacing corresponding to the spacing between the sections in the human head, a three-dimensional representation of the human head is thus presented. A similar system could be used for any other part of the body, or even for the whole body, depending upon the size of the container and the degree of detail required. The plates could be stored separately from the container, so that only those plates containing the region to be examined need be fitted into the container, thus avoiding the inclusion of unnecessary detail. The plates could carry sections taken through the head at, for example 1 mm spacings. Full sections, as in FIG. 7, could be taken at 2 mm intervals and half sections, as in FIG. 8, taken at the intervening spacings. This form of the apparatus is particularly useful in teaching of anatomy and practice of surgery.

A somewhat similar system could also be used as an aid to surgery and diagnosis, in which tomograms are carried by the panels. A tomogram is an X-ray photograph especially focussed in sectional form. Thus, a series of tomograms could be used to give a three-dimensional representation of a patient's condition. The details sections of FIGS. 7 and 8 are not intended to be specific to any particular individual, and are therefore a more general representation of sections of the human body.

As a teaching or surgical aid, the panels could be provided merely with a series of outlines, so that details corresponding to just those parts under examination could be filled in by a student or surgeon.

In FIGS. 2 and 3 the panels are mounted directly to the supporting framework by tensioning connectors.

Figure 9:
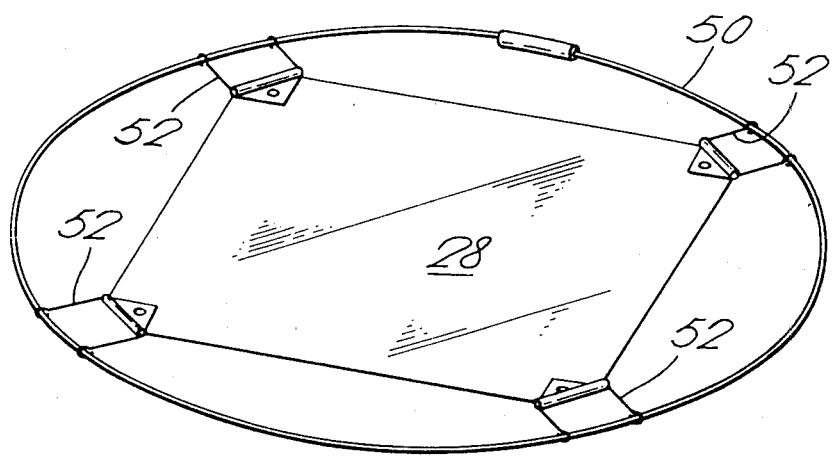
FIG. 9 shows a perspective view of an alternative panel construction.

However, the panels may be carried by frames which are in turn mounted to the support framework. The panel frame can supply the tension to the panel so that it can be mounted to the supporting frame in the most convenient way without using any tensioning device in the connection. The panel frame should be such as to apply equal tension to the corners of the sheet, so as to minimise distortion. A circular frame is most convenient. As shown in FIG. 9 a square flexible transparent film panel 28 is connected at its corners to a circular hoop 50 of spring steel. This is conveniently done by wire clips 52. The hoop keeps the panel under tension and can be mounted to four vertical support posts by means of spring clips. A number of such panels can be mounted at different heights on the support posts. The posts can be externally threaded, so that the clips engage the threads and are thereby kept at the desired position. The threads allow the positions of the clips to be adjusted within close limits, but if this is not required the posts can be provided with regularly spaced grooves or slots which are engaged by the clips. These grooves can, for example be at 1 cm. or any other convenient spacing.

Figure 10:
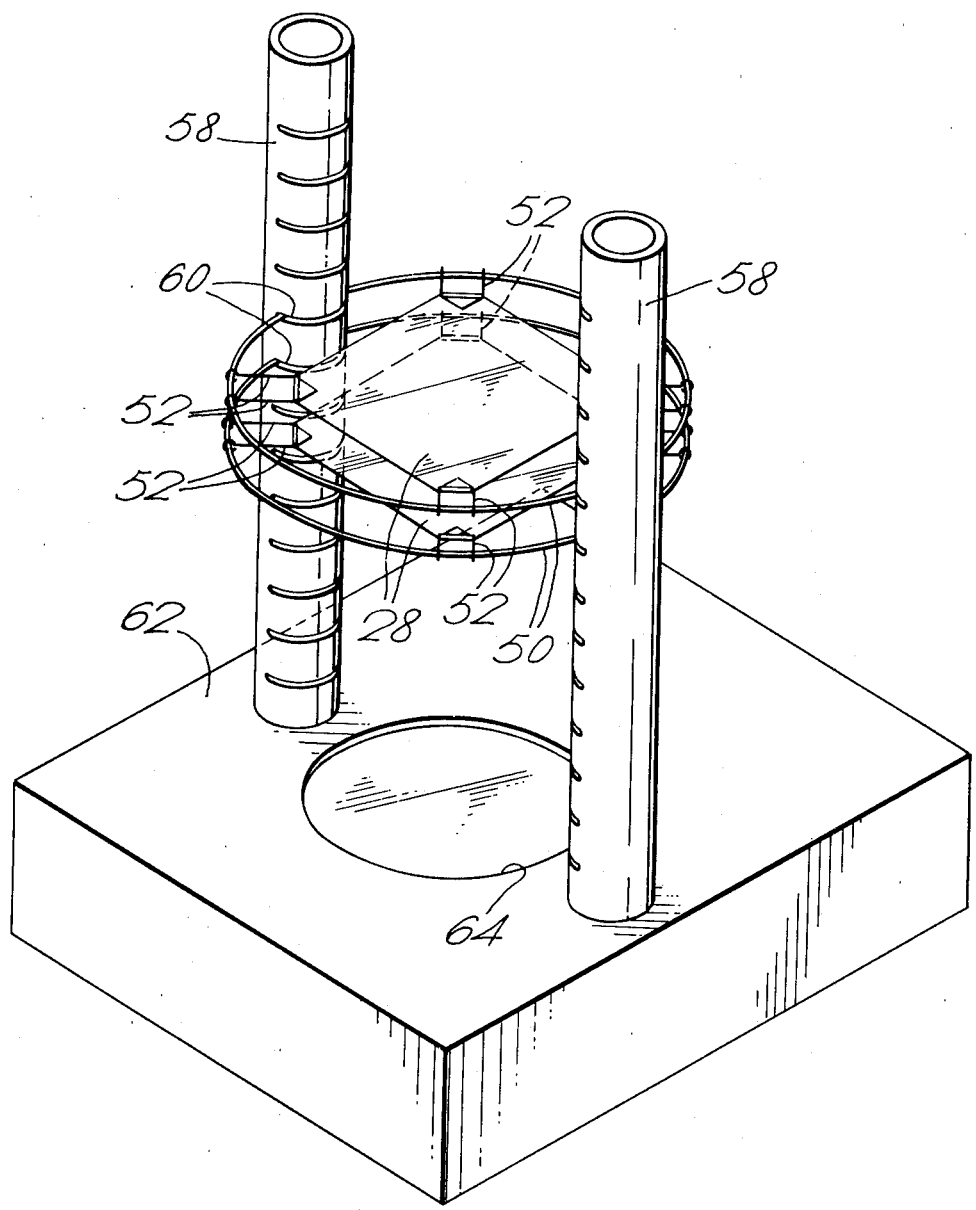
FIG. 10 shows diagrammatically one form of mounting of the panel of FIG. 9 to a support structure.

FIG. 10 shows how the hoop frame 50 can be mounted directly to vertical support posts 58. Horizontal slots 60 are cut in the posts, and the hoop frame slides into them. If the posts are of sufficiently large diameter, only two such posts may be needed to support the panels in parallel horizontal relationship. (In this drawing only two panels are shown, but a series of them can be similarly mounted at different heights). The posts 58 are shown projecting from a base 62 which forms a light box for illuminating the panels; the light issuing through an opening 64 in the top.

Instead of being carried by a circular surround frame, the panel 28 can be carried in frames of alternative outline. For example, the corners of the square panel could be connected to the middle of the sides of a square surround frame of spring steel. An octagonal frame of spring steel might be used: the corners of the panels being connected to four of the sides of the frame.

Figure 11:
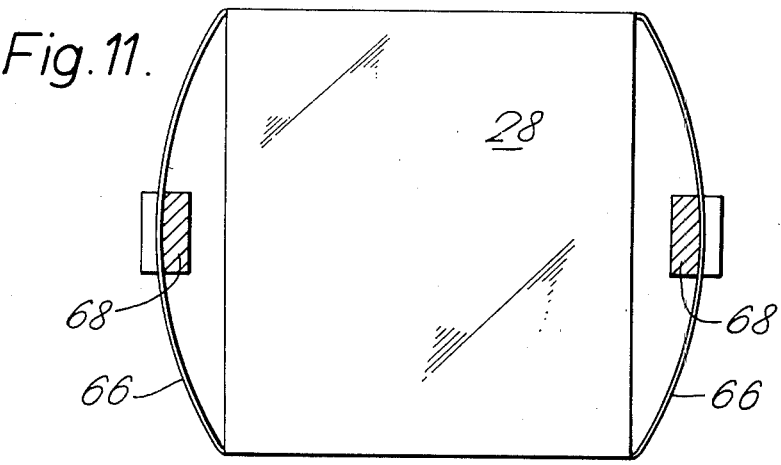
FIG. 11 shows a plan view of another form of panel construction.

In an alternative arrangement shown in FIG. 11; a rectangular flexible panel 28 has slender rods of spring steel 66 extending along opposite sides and connected to the corners so that the rods are bowed, thereby keeping the panel under tension in one direction. These bowed rods can then be passed over support posts 68 sufficiently far apart so that the panel is tensioned also in the other direction. The posts may be slotted or grooved on the outside, as shown, to locate the rods at a desired level.

In another embodiment, the transparent panels can be suspended from an overhead support frame. They can be individually suspended in vertical planes, the overhead support member representing one horizontal axis on which the spacing of the panels is determined. Alternatively, the panels can be suspended in horizontal planes one above another. In this latter arrangement it may be convenient for each panel to be suspended from the panel next above. Spacers can be inserted if desired to secure the panels against relative displacement. When the equipment is not required, the stack of panels can be easily collapsed, first removing the spacers if present.

It will be apparent that an important feature of this invention is that the spatial internal arrangement of the body can be presented three-dimensionally with detail which can be varied as desired, simply by appropriate choice of sections to be fitted to the viewing device. Unwanted details can thus be omitted, leaving the more important parts to be viewed more easily.

The panels can be made of any convenient transparent material, such as glass or transparent plastics as noted above. Panels having surface contours could be prepared by injection moulding or thermoforming. In the latter case, the sheet stock could be preprinted in a special distorted form so that after thermoforming the print appears in the correct form. For really accurate work, float glass plates are preferred for the panels, and to obtain accurate spacing of the panels screw adjusters may be provided at the corner mountings.

Although an x, y, z box grid reference system has been described for use with the apparatus, the x, y-grid can be replaced by a radial grid if desired. This may be suitable, for example with representation of the human body, where the z-axis passes centrally down through the body and represents a central datum. Each panel thus has a radial grid centered on this datum, this radial grid consisting of a series of concentric circles and intersecting radial lines. A reference book for use with the anatomical sections would contain corresponding sections and a suitable grid printed over each illustration, or else provided on a transparent sheet to be laid over each illustration. The reference book could have a radial grid reference system while the viewing apparatus has a box grid reference system. In this case, suitable information would have to be provided to enable radial co-ordinates to be converted to box grid co-ordinates.

With a suitable accurate reference system, the apparatus of the present invention can be used to define almost any position in a living organism, so that this location can be identified by the radiologist, surgeon or other medical practitioner, or student or the like. From this information, the user can select with reasonable accuracy the desired position on the patient (or other body). A surgeon can thus pinpoint and carry appropriate surgery on the relevant area. The invention can be used for the collection, collation and numerical identification and storage of datum produced by a rotary scanner, of known type, which produces tomograms, and is therefore useful ancillary equipment for a rotary scanner.

Figure 12:
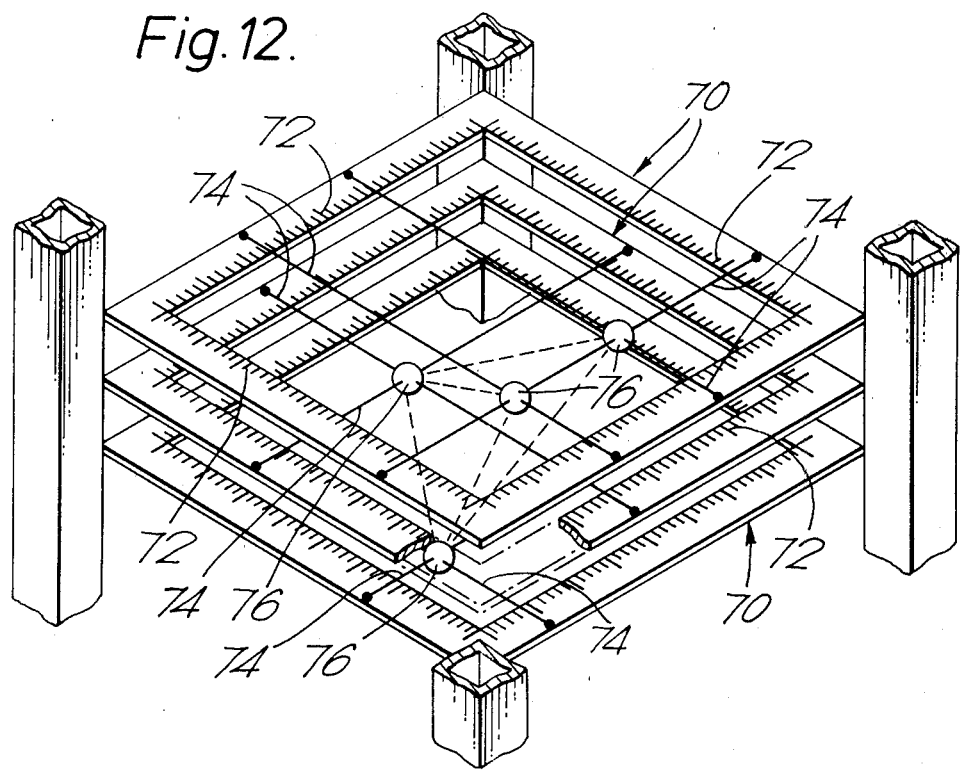
FIG. 12 shows diagrammatically a perspective view of the use of open frame panels.

FIG. 12 illustrates diagrammatically a modification of the present invention in which, instead of transparent sheet panels 28, open frames 70 (only three are shown here) are mounted in a similar fashion to a support structure. The support structure can be as described in the foregoing embodiments, and therefore is not illustrated in detail here. As illustrated, each frame 70 is of square outline, and is provided with scales 72 along adjacent sides. Wires 74 can be attached to opposite sides of each frame so as to extend across the central space parallel to the other sides of the frame. The exact locations of the wires can be determined using the scales, so that each wire represents an x or y co-ordinate for that frame. Intersections of wires thus provide x, y co-ordinates for that point. The z co-ordinate is of course provided by the level of that particular frame on the support structure. This system could be used, for example, for constructing three-dimensional molecular models. Slotted spheres 76 representing the various atoms can be attached to the wires at the points of intersection. They can be interconnected by adhering the spheres directly together if they touch, or by means of connecting rods if they do not touch. Once the molecular model is complete, the wires can be withdrawn from the spheres and the complete model removed from the frames.

Instead of wires, needles with circular eyes could be fitted to the frames 70 so that the eyes are at desired x, y co-ordinate positions. Threads or malleable wires can then be passed through the eyes to represent complex curved paths in space, thereby facilitating the study of such paths.

The modification represented by FIG. 12 may not require the provision of special lighting arrangements for viewing the three-dimensional structure, although in some cases it may be useful, particularly where the structure is to remain in situ in the frames. Also, since the support framework with special lighting facilities may be required for use with the transparent sheet panels as described earlier, such a framework could conveniently also be used for supporting the open frame panels.

We claim:

1. Multi-dimensional display equipment, comprising a plurality of transparent panels bearing representations of cross-sections of a three-dimensional body, and a support structure in which the panels are mounted in their correct relative order and spaced apart, and allowing the sectional representations to be viewed in situ from different positions externally of the structure by means of light transmitted through the transparent panels, the support structure being adapted to support the panels individually and peripherally so that they are individually removable from the support structure to vary the amount of the body represented or replaceable by panels representing a different body, the panels being rectangular and of flexible material and operatively mounted to the support structure, resilient means for applying tension to the corners of the panels whereby the panels are omni-directionally tensioned in a manner which is capable of maintaining the panels in an essentially flat planar configuration in a horizontal plane or in any other plane.

2. Display equipment according to claim 1, which includes means for determining co-ordinates of a point on a said panel both in terms of its position in relation to the panel and also in terms of its position on an axis (herein referred to as the z-axis) intersecting the planes of the panels.

3. Display equipment according to claim 2 wherein the co-ordinate determining means includes a scale on the support structure along the z-axis arranged so as to show the location of the panels on that axis.

4. Display equipment according to claim 2 wherein the co-ordinate determining means includes scales extending parallel to the planes of the panels, by means of which the co-ordinates of a said point in relation to its respective panel may be determined.

5. Display equipment according to claim 4 wherein the scales parallel to the panels are provided on the support structure.

6. Display equipment according to claim 4 wherein the scales parallel to the panels are provided on the panels.

7. Display equipment according to claim 6 wherein the scales take the form of a grid of intersecting lines extending over the area occupied by the cross-sectional representation on the panel.

8. Display equipment according to claim 4 wherein the scales parallel to the panels are provided on separate transparent sheets which can be superimposed on the panels.

9. Display equipment according to claim 8 wherein said scales take the form of a grid of intersecting lines.

10. Display equipment according to claim 1 wherein the support structure takes the form of a container, having means therein for supporting the panels, and transparent or open-sided walls through which the panels may be viewed.

11. Display equipment according to claim 1 wherein the mounting of the panels to the support structure allows the spacing of the panels to be adjusted.

12. Display equipment according to claim 11 wherein the panels are mounted to the support posts through resilient connections which apply tension to the panel.

13. Display equipment according to claim 1 wherein the transparent panels are held in individual sub-frames which are mounted to the support structure.

14. Display equipment according to claim 1 wherein the support structure includes light reflection means for directing light from an external source through the spaced panels.

15. Display equipment according to claim 1 wherein the support structure includes means for illuminating the supported panels so that they can be externally viewed by light transmitted therefrom through the spaced panels.

16. Display equipment according to claim 1 wherein separate transparent sheets bear the cross-sectional representations and are superimposed on the transparent panels.

17. Multi-dimensional display equipment according to claim 1 and including spacer means for spacing the panels apart when formed into a stack so that the sections on the panels may be located in their correct relative order and spacing to provide an impression of the three-dimensional body when viewed by means of light passing through the stack.

18. A set of transparent panels according to claim 17, wherein the spacer means are integral mouldings projecting from the surfaces of the panels.

19. A set of transparent panels according to claim 18 wherein the spacer means are magnetic elements, whereby the panels can be held in the stack between pairs of said elements magnetically attracted to each other.

20. Display equipment according to claim 13 wherein the sub-frames are of closed-loop spring form to apply said tension.

21. Display equipment according to claim 20 wherein said support structure comprises two posts in diametrically opposed positions relative to said sub-frames mounted thereto.

22. Display equipment as claimed in claim 1 in which said resilient means for each panel of said panels is a closed loop spring, the closed loop spring being operatively connected to each corner of the respective panel and being mounted on said support structure.

23. Display equipment as claimed in claim 1 in which said resilient means for each panel of said panels includes a plurality of springs, each spring being connected to one corner of the panel and to the support structure.

* * * * *